WITNESSES:
Bernard R. Gregura
James F. Young

INVENTOR
John Mattern
BY
Ernest P. Klipfel
ATTORNEY

United States Patent Office 3,388,336
Patented June 11, 1968

3,388,336

PHASE SHIFT AMPLIFIER APPARATUS USING CONSTANT K FILTER NETWORKS IN PUSH-PULL RELATIONSHIP

John Mattern, Baltimore, Md., assignor to Westinghouse Electric Corporation, Pittsburgh, Pa., a corporation of Pennsylvania Filed Feb. 11, 1965, Ser. No. 431,836
18 Claims. (Cl. 330—10)

ABSTRACT OF THE DISCLOSURE

Phase shift amplifier including first and second signal paths each including a constant K filter. A carrier signal is applied to both of the constant K filters which operate in push-pull relationship and the phase shift characteristics of these filters are changed in accordance with an input signal. The signal in one path is additionally phase shifted and applied, along with the signal in the other path to a hybrid network which then provides a resultant vector summation which varies in amplitude in accordance with the input signal. The hybrid network output is detected and applied to a load device.

This invention relates to amplifier circuitry in general and more particularly to a phase shift amplifier utilizing a pair of constant K filter networks for transferring electrical energy from a carrier or pump signal to an input signal in order to effect a power gain.

It is an object of the present invention to provide an improved phase shift amplifier having an extremely low noise figure.

It is another object of the present invention to provide a broadband phase shift amplifier having an improved gain-bandwidth product.

It is yet another object of the present invention to provide a low noise phase shift amplifier capable of operating from very low frequencies to the microwave region of the radio frequency spectrum.

Briefly, the subject invention comprises the use of at least two constant K filters which operate in push-pull relationship to phase modulate a carrier or pump signal by means of an input signal. Each of the two constant K filters have preferably the same number of filter sections and operate such that the phase of the carrier signal is retarded by the input signal in one filter while it is advanced in the other. The respective phase modulated carrier signals are subsequently combined in a hybrid network to provide composite signals which are then demodulated to recover the input signal which is amplified due to the fact that less power is required to phase modulate the carrier than is recovered at the phase detector.

Other objects and advantages of the present invention will become more apparent as a study of the following detailed specification proceeds when read in conjunction with a consideration of the following drawings, in which.

Figure 1:
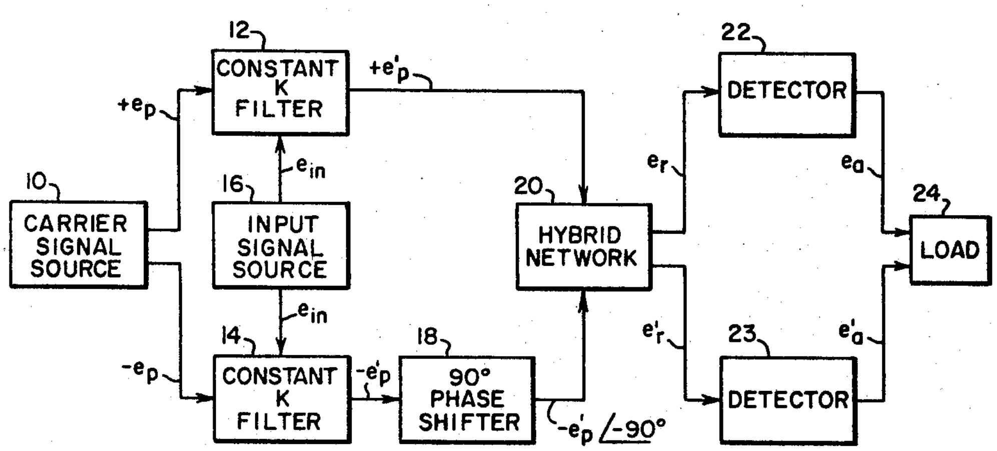
FIGURE 1 is a block diagram illustrative of the present invention.

Referring now more particularly to the drawings, the block diagram in FIG. 1 discloses a carrier signal source 10 adapted to feed carrier signals $+e_p$ and $-e_p$ to the constant K filters 12 and 14, respectively. An input signal source 16 feeds an input signal $e_{in}$ simultaneously to both constant K filters 12 and 14. The output $+e_p'$ of the constant K filter 12 is fed directly to the hybrid network 20 while the output $-e_p'$ of constant K filter 14 is applied to the input of the 90° phase shifter circuit 18. The output $-e_p' \angle -90°$ of the phase shifter 18 is then applied to the hybrid network 20. Coupled to the output of the hybrid network 20 is a pair of detectors 22 and 23 which in turn are connected to a load 24.

The inventive concept contemplates applying a pump or carrier signal $e_p$ from the source 10 to the constant K filters 12 and 14. The signals $+e_p$ and $-e_p$ are of opposite polarity signifying that the constant K filters 12 and 14 are operated in push-pull relationship. The input signal $e_{in}$ from the input signal source 16 is fed to the constant K filters 12 and 14 in such a manner that the phase shift characteristic of these filters are changed in accordance with the input signal $e_{in}$. In addition, the input signal $e_{in}$ is adapted to change the phase characteristics of the filters 12 and 14 in mutually opposite directions. For example, when the phase of the carrier signal $+e_p$ is advanced in one filter, the carrier signal $-e_p$ is retarded in the other. In other words, the filters 12 and 14 operate such that the input signal increases the capacitive reactance in one side while decreasing it on the other, and vice-versa. The output $-e_p'$ of the constant K filter 14 is fed to the 90° phase shifter 18 which is preferably a 90° lag network which retards the carrier signal $-e_p'$ by 90°. This signal is designated $-e_p' \angle -90°$. The signal $-e_p' \angle -90°$ is fed to the hybrid network 20 where it is summed with the output $+e_p'$ of the constant K filter 12 to provide a pair of signals $e_r$ and $e_r'$. These signals $e_r$ and $e_r'$ are now amplitude modulated in push-pull and are demodulated by detectors 22 and 23 which are preferably a pair of full wave envelope detectors. The detected signals $e_a$ and $e_a'$ are magnified replicas of $e_{in}$. The polarity of the detectors is such that the detected outputs $e_a$ and $e_a'$ will be in phase.

Figure 2:
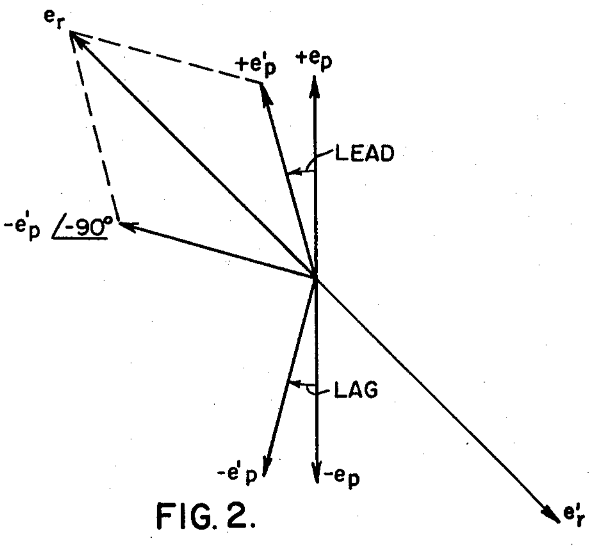
FIG. 2 is a vector diagram helpful in understanding the operation of the present invention.

FIG. 2 is a diagram helpful in understanding the operation just described. The vectors $+e_p$ and $-e_p$ are representative of the mutually opposite phased carrier signals from the carrier source 10. The vector $+e_p'$ and $-e_p'$ are shown leading and lagging the vectors $+e_p$ and $-e_p$, respectively, illustrating the effect of the input signal $e_{in}$ upon the two constant K filters 12 and 14. The vector $-e_p' \angle -90°$ is illustrative of the voltage output from the 90° phase shifter 18, the vector $e_r$ is one output of hybrid network 20 and is representative of one vector summation of inputs $+e_p'$ and $-e_p' \angle -90°$ to the hybrid network 20 and the vector $e_r'$ is the other output of hybrid network 20 and is 180° out of phase with vector $e_r$. It should be borne in mind that the vectors $e_r'$ vary in amplitude depending upon the phase relationship between the vectors $+e_p'$ and $-e_p' \angle -90°$. Since these respective vectors are controlled by the input signal $e_{in}$ on the filters 12 and 14, the resultant vectors $e_r'$ will also be varying in amplitude in accordance therewith.

Figure 3:
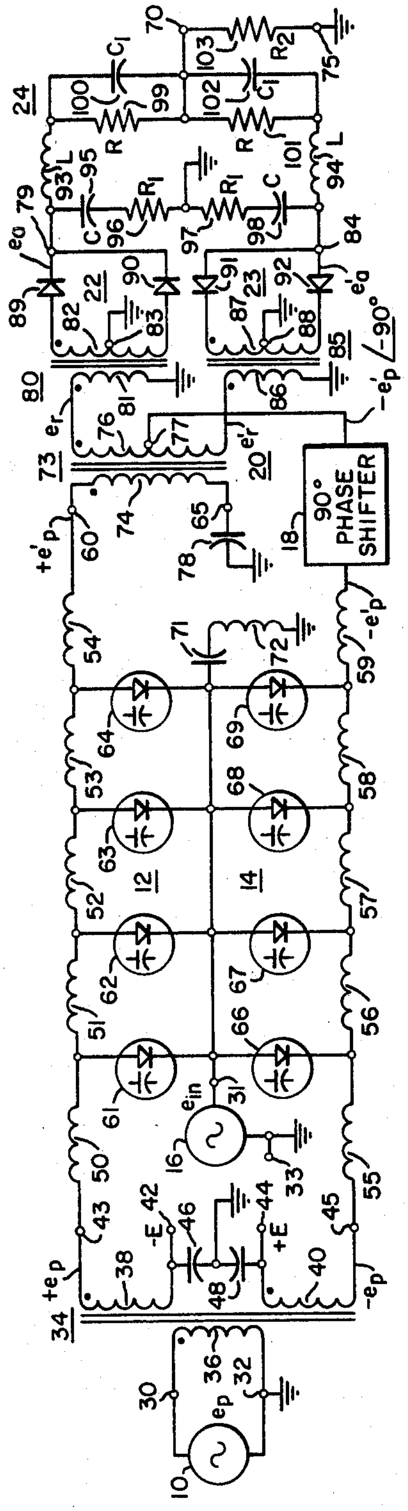
FIG. 3 is an electrical schematic diagram illustrative of the preferred embodiment of the subject invention.

Referring now to FIG. 3 which schematically illustrates a preferred embodiment of the subject invention, the carrier, sometimes referred to as a pump, signal source 10 is shown coupled across terminals 30 and 32 of the primary winding 36 of transformer 34. Terminal 32 is returned to the point of reference potential hereinafter referred to as "ground." The secondary winding 38 of transformer 34 has one end thereof terminated at terminal 42 which is adapted to be connected to a negative potential —E from a power supply, not shown. The opposite end of secondary winding 38 is terminated at terminal 43. Terminals 30 and 43 have like instantaneous polarity (as indicated by the black polarity dot). Coupled to terminal 43 is the constant K filter network 12 shown comprised of four constant K filter sections with each section being comprised of two inductor elements and one voltage variable capacitor shown and referred to hereinafter as a capacitive diode. The capacitance of such a diode is variable in accordance with the potential applied thereacross.

More specifically, the constant K filter 12 is comprised of a first inductor 50 connected to second inductor 51 with the capacitive diode 61 connected to the common connection therebetween. The capacitive diode 61 is poled such that the bias potential −E when applied to terminal 42 tends to render the diode 61 non-conductive. Similarly, with respect to the other sections of the filter 12, capacitive diode 62 is connected to the common connection between inductors 51 and 52, the capacitive diode 63 is connected to the common connection between inductors 52 and 53, and finally the capacitive diode 64 is connected to the common connection between inductors 53 and 54. The inductors 50 through 54 are all connected in series to the secondary winding 38 with the anode electrodes of the respective capacitive diodes 61 to 64 being connected to the common connections between the inductors. The cathode electrodes of capacitive diodes 61 through 64 are commonly connected to terminal 31 to which is connected the input signal source 16. The inductor 54 of the fourth section of the filter 12 is connected to one end of the primary winding 74 of the transformer 73 through terminal 60. The opposite end of the winding 74 is terminated at terminal 65 and coupled to ground through the capacitor 78.

Considering again the transformer 34, the secondary winding 40 has one end terminated at terminal 44 to which is coupled a positive potential +E from a power supply, not shown. The opposite end of the secondary winding 40 is coupled to the constant K filter 14 through terminal 45. As indicated by the polarity dots, terminals 44 and 30 have like polarity. Capacitors 46 and 48 are connected between terminals 42 and 44 and ground, respectively and act as by-pass capacitors to shunt any signal frequencies to ground so as to prevent them from being fed back into the respective power supplies. It should also be pointed out that terminals 43 and 45 of windings 38 and 40, respectively, are of mutually opposite polarity.

The filter 14 is comprised of four sections with inductor 55 being directly connected to the secondary winding 40. Inductors 56, 57, 58 and 59 are all connected in series to the inductor 55. The capacitive diode 66 is connected to the common connection between inductors 55 and 56 and is poled such that a positive potential +E when applied to terminal 44 tends to render capacitive diode 66 non-conductive. This means that the cathode electrode of capacitive diode 66 is connected to the common connection between inductors 55 and 56. In a like manner, capacitive diodes 67, 68 and 69, are connected to the common connections between the inductors 56, 57, 58 and 59, respectively. The anode electrode of capacitive diodes 66 through 69 are commonly connected to terminal 31. It should be observed then when an input signal $e_{in}$ is applied to terminal 31, the diodes 61 to 64 forming part of the constant K filter 12 will be responsive in an opposite sense with respect to the diodes 66 to 69 forming the constant K filter 14.

The last inductor 59 of the constant K filter 14 is connected to the 90° phase shifter 18 which can be of any desired type known to those skilled in the art. The output of the phase shifter is coupled to the center tap 77 of a secondary winding 76 of transformer 73. This connection in conjunction with the inductor 54 being coupled to the primary 74 provides what is commonly referred to in the art as a transformer hybrid and is representative of the hybrid network 20 shown in FIG. 1.

The output of the hybrid network 20 is adapted to be taken off of both ends of the secondary winding 76. In the present embodiment, an output is taken off of each end of secondary winding 76 and applied as separate inputs to a pair of full-wave detector circuits 22 and 23. The combination of the hybrid 20 and the detectors 22 and 23 constitute a phase detector. In greater detail, one end of secondary winding 76 is directly connected to the primary winding 81 of transformer 80. The opposite end of primary winding 81 is returned to ground. With respect to the opposite end of secondary winding 76, it is directly connected to the primary winding 86 of transformer 85. The opposite end of primary winding 86 is also returned to ground. With respect to the secondary windings 82 and 87 of transformers 80 and 85, respectively, the center taps 83 and 88 are also returned to ground. One end of secondary winding 82 is directly connected to the anode electrode of the diode 89 while the opposite end is directly connected to anode of diode 90. The secondary winding 87 has its end terminals connected to diodes 91 and 92; however, they are connected to the cathode electrodes thereof. With a configuration as shown, the diodes 89 and 90 only conduct when positive polarity signals appear at their respective anodes while the diodes 91 and 92 only conduct when negative polarity signals appear at their cathodes. Since the secondary windings 82 and 87 have their center taps 83 and 88, respectively, returned to ground, one of the diodes of each pair connected to a respective secondary winding will conduct during each half cycle of operation yielding a full-wave output when diodes 89 and 90 have their cathode electrodes commonly connected to junction 79, and diodes 91 and 92 have anode electrodes commonly connected to junction 84.

The load circuit 24 is connected to junctions 79 and 84 and partly comprises a capacitor (C) 95 connected in series to a resistor ($R_1$) 96 between terminal 79 and ground. A similar resistance-capacitance combination is coupled from junction 84 to ground and comprises a capacitance (C) 98 connected in series to a resistance ($R_1$) 97. An inductor (L) 93 is connected in series to resistance (R) 99 to output terminal 70. Similarly, an inductor (L) 94 is connected to junction 84 while the opposite end thereof is connected in series to resistance (R) 101 whose opposite end is connected to the output terminal 70. Two capacitors ($C_1$) 100 and 102 are connected in series across resistances 99 and 101. An output load resistance ($R_2$) 103 is connected between the output terminals 70 and 75.

In operation, the preferred embodiment of the subject invention shown in FIG. 3 operates in substantially the same manner as that described with respect to the block diagram illustrated in FIG. 1. A carrier signal $e_p$ applied across the primary winding 36 will be fed simultaneously to the constant K filter networks 12 and 14 in mutually opposite polarity senses due to the connections of the secondary windings 38 and 40, providing $+e_p$ and $-e_p$ as indicated by the polarity dot associated therewith. The constant K filters 12 and 14 produce two signal paths for the respective carrier signals $+e_p$ and $-e_p$; however, due to the transformer connection shown, the filters 12 and 14 operate in push-pull relationship, i.e., one filter operates in phase opposition to the other. For example, when a positive polarity signal appears along the inductors 50 through 54, the capacitive diodes 61 through 64 tend to become conductive; however, the negative bias potential applied to terminal 42 will establish a proper operating point for the diodes so that each will exhibit a predetermined value of capacitance. Similarly, with respect to constant K filter 14, when a negative polarity signal appears at the inductors 55 through 59, the capacitive diodes 66 through 69 tend to become conductive; however, the positive bias potential applied to terminal 44 will establish a predetermined operating point for a selected value of capacitance.

By applying the input signal $e_{in}$ to terminal 31, the capacitance of the diodes 61 through 69 will change in accordance therewith. For instance, an input signal appearing at terminal 31 will cause capacitive diodes 61 through 64 to increase in capacitance while the same signal will cause capacitive diodes 66 through 69 to reduce in capacitance. These diodes then electronically change the filter characteristics of constant K filters 12 and 14. More particularly, the diodes 61 through 69 will alter the phase of the signal traveling along the inductors 50 through 59 and become in effect electronically controlled phase shifters. The constant K filters 12 and 14 are said to phase modulate the carrier signals $+e_p$ and $-e_p$ along their respective signal paths. The phase modulated signal at the output of the constant K filter 12 is fed to the primary winding 74 while the phase modulated carrier signal at the output of constant K filter 14 is fed to the 90° phase shifter 18 where it preferably is retarded in phase such as shown with respect to FIG. 2 and then applied to the center tap 77 of the hybrid network 20. The hybrid network 20 operates to vectorially sum the signal $+e_p'$ appearing across the primary winding and the signal $-e_p'\angle -90°$ applied to the secondary center tap. The signals $e_r$ and $e_r'$ appearing at the ends of winding 76 then are composite signals 180° out of phase with respect to one another indicative of the summation of the two phase modulated signals. These composite signals $e_r$ and $e_r'$ appearing at the end terminals of secondary winding 76 are primarily amplitude modulated in accordance with the input signal $e_{in}$ which by feeding them respectively to transformers 80 and 85, amplitude varying signals $e_a$ and $e_a'$ will appear at junctions 79 and 84 respectively.

In order to maintain a broadband match of the aforementioned circuitry to the output load $R_2$ connected across output terminals 70 and 75, a carrier load comprising $R_1$ and C is coupled between junction 79 and ground, and junction 84 and ground. These networks operate to by-pass to ground any of the rectified components of the carrier $e_p$. The signal load comprises the inductor L in series with the resistor R plus the resistor $R_2$. The output signal, however, will be taken across $R_2$ at output terminals 70 and 75. Since the DC outputs $e_a$ and $e_a'$ from the phase detector 22 are in phase, still another load is required. This load, referred to as the DC load, comprises R and $C_1$ with the time constant $RC_1$ being larger than the period of the lowest signal to be amplified. Also, the value of R is adjusted for minimum reflection by the phase detectors 22 and 20. In order for the total impedance of the load circuit 24 to appear resistive to transformers 80 and 85 of the phase detector 22, the following relationship must be maintained:

$$2R_1R_2=L/C \qquad (1)$$

where R is measured in ohms, L is measured in henries and C is measured in farads.

It can analytically be shown that less power is required to phase modulate the carrier signal $e_p$ by means of the input signal $e_{in}$ than is recovered at the output of the phase detector. For example, it can be shown that the total available power $P_{out}$ to the output load $R_2$ is:

$$P_{out}=\frac{e_p^2\left(\frac{\Delta C}{C_o}\right)^2 N^2\eta}{2R_2} \qquad (2)$$

where $e_p$ is the peak value of the pump voltage present at the inputs to the matched constant K filters 12 and 14;

$$\frac{\Delta C}{C_o}$$

is equal to the relative change in capacitance of the filters, where C is the actual capacity in farads of the center arm of the filter; and where $C_o$ is the nominal capacity in farads of the center arm; where N is equal to the number of filter sections; $\eta$ is equal to the rectification efficiency of the phase detector; and $R_2$ is the resistance of the output load in ohms.

Likewise, the available input power from the input signal source 16 having an internal source resistance $R_s$ can be expressed as:

$$P_{in}=\frac{\left(\frac{\Delta C}{C_o}\right)^2}{2k^2\times 4R_s} \qquad (3)$$

where $$\frac{\Delta C}{C_o}$$

is the relative change in capacitance as noted with respect to Equation 1; where $k$ is a proportionality constant determined from the capacitive diode characteristics; and $R_s$ is the impedance in ohms of the signal source 16.

The ratio of $P_{out}/P_{in}$ provides the desired expression from Equations 2 and 3 for power gain (P.G.) according to the equation:

$$\text{P.G.}=\frac{4(e_pk)^2N^2\eta R_s}{R_2} \qquad (4)$$

In an illustrative example of the present invention, the following typical values could be used for a pump frequency of approximately 40 megacycles:

$R_s$=100 ohms
$R_2$=25 ohms
N=4 sections
$\eta$=.8 (assumed value)
$k$=.10 (average value for $C_o \approx 100\ \mu\mu f.$)
$e$=4.2 volts peak From these typical values, the power gain can be calculated to be:

P.G.=18.2

In actuality, an experimental determination has been made of the power gain provided by the embodiment shown in FIG. 2 with substantial correlation between the experimental and theoretical calculations.

What has been shown and described therefore is a phase shift amplifier using a constant K filter network acting as an electronically controlled phase shifter for phase modulating a carrier signal in accordance with an input signal. The phase modulated signal is subsequently demodulated or detected providing an output signal which is an amplified reproduction of the input signal. The apparatus described with respect to the subject invention is inherently a low noise device which with improved diodes and inductors will contribute virtually no excess noise. Also the phase detector will detect amplified power levels so that its excess noise contribution is reduced by the amplifier gain. Furthermore, noise in the carrier source may be reduced by filtering or by use of a balance amplifier system as is commonly employed in low level microwave mixers well known to those skilled in the art.

While there has been shown and described what is at present considered to be the preferred embodiment of the invention, modifications thereto will readily occur to those skilled in the art. For example, the subject apparatus is applicable to microwave strip line construction using modern pill type varactors and ring hybrid circuits. It is not desired therefore that the invention be limited to those specific arrangements shown and described but it is to be understood that all equivalents, alterations, and modifications within the spirit and scope of the present invention are herein meant to be included.

I claim as my invention:

1. A phase shift amplifier for electrical signals comprising in combination: first input means adapted to receive a carrier signal from a first signal source; a first signal path coupled to said first input means for transmitting said carrier signal and including means for varying the phase shift of said carrier signal; a second signal path coupled to said first input means and including means for varying the phase shift of said carrier signal; first circuit means for coupling said first signal source to said first and said second signal path for operating said first and said second signal paths in push-pull relationship; second input means coupled to said first and said second signal path for applying an input signal thereto, said input signal being utilized to phase modulate said carrier signal in said first and said second signal paths in mutually opposite senses; a fixed phase shift network coupled to said second signal path; a hybrid network coupled to said first signal path and said fixed phase shift network for providing a composite signal varying in accordance with said input signal; detector means coupled to said hybrid network for providing a signal varying in amplitude in accordance with said composite signal; and load circuit means coupled to said detector means for providing an amplified output signal in accordance with said input signal.

2. A phase shift amplifier for electrical signals comprising in combination: first circuit means adapted to receive a carrier signal from a carrier signal source; a first filter network having a variable phase shift coupled to said first circuit means; a second filter network also having a variable phase shift coupled to said first circuit means, said first and said second filter networks being operable in push-pull relationship to transmit said carrier signal; second circuit means coupled to said first and said second filter network for applying an input signal thereto, said input signal being adaptable to phase modulate said carrier signal by varying the phase shift of said first and said second filter networks in mutually opposite directions; a fixed phase shift network coupled to said second filter network; a hybrid network coupled between said first filter network and said first fixed phase network for providing a vectorial resultant signal varying with respect to said input signal; detector means coupled to said hybrid network forming a phase detector circuit thereby for providing a signal varying in amplitude in accordance with said resultant signal; and load circuit means coupled to said detector means for providing an amplified output signal in accordance with said input signal.

3. A phase shift amplifier of electrical signals comprising in combination: first input means adapted to receive a carrier signal from a first signal source; a first contant K filter network adapted to have a phase shift which is variable in accordance with an electrical signal; first circuit means coupling said first constant K filter to said first input means; a second constant K filter network adapted to have a phase shift variable in accordance with an electrical signal; second circuit means coupling said second constant K filter to said first input means, said first and said second constant K filter network being adapted to operate in push-pull relationship thereby; second input means coupled to said first and said second filter network for applying an input signal thereto, said input signal being effective to phase modulate said carrier signal by varying the phase shift of said first and said second constant K filter networks in a mutually opposite phase relationship; a fixed phase shift network coupled to said second constant K filter network; a hybrid network coupled between said first constant K filter network and said fixed phase shift network for providing a composite signal varying in accordance with said input signal; demodulator means coupled to said hybrid network for providing a signal varying in amplitude in accordance with said composite signal; and load circuit means coupled to said detector means for providing an output signal amplified with respect to said input signal.

4. A phase shift amplifier of electrical signals comprising in combination: a first pair of input terminals for receiving a carrier signal; inductor means coupled to said first pair of input terminals; a first and a second filter network having a voltage variable phase shift coupled to said inductor means and adapted to be driven in push-pull relationship thereby; a second pair of input terminals coupling an input signal to said first and second filter network for varying the phase shift thereof in mutually opposite directions in accordance therewith; fixed phase shift means coupled to one filter of said first and said second filter networks; a hybrid network coupled between said fixed phase shift network and the other of said first and said second filter networks for summing signals from said phase shift network and said one filter network to provide a composite signal varying in accordance with said input signal; detector means coupled to said hybrid network, providing a phase detector circuit thereby, for providing an amplitude varying signal in accordance with said composite signal; and load circuit means coupled to said phase detector means for providing an amplified output signal of said input signal.

5. Apparatus as set forth in claim 4 wherein said inductor means comprises a transformer having a primary winding and at least two secondary windings, said primary winding being adapted to be connected to said first pair of input terminals and wherein one of said at least two secondary windings is connected to said filter network and the other of said at least two secondary windings is connected to said second filter network, with said at least two secondary windings being selectively poled so that mutually opposite polarity signals are applied to said first and said second filter networks.

6. Amplifier apparatus as set forth in claim 4 wherein said first and said second filter networks are comprised of a predetermined number of constant K filter sections.

7. Amplifier apparatus as set forth in claim 4 wherein said first and said second filter networks are comprised of constant K filter networks each having voltage variable capacitance means which is responsive to said input signal for varying the phase shift of said carrier signal applied to said input terminals in mutually opposite directions.

8. A phase shift amplifier of electrical signals comprising in combination: first input terminals for receiving a carrier signal; transformer means coupled to said first input terminals, said transformer means having a primary winding and two secondary windings, said first input terminals being coupled to said primary winding; a first constant K filter network coupled to one of said two secondary windings for providing a first signal path for said carrier signal, said first constant K filter being comprised of fixed inductor and variable capacitance means responsive to an electrical signal applied thereto; a second constant K filter network coupled to the other of said two secondary windings for providing a second signal path for said carrier signal; said second constant K filter network also being comprised of fixed inductor and variable capacitance means responsive to an electrical signal applied thereto; said two secondary windings being oppositely poled with respect to one another to drive said first and said second constant K filter network in push-pull relationship; second input terminals coupled to said first and said second constant K filter network for applying an input signal thereto, said input signal being operable to vary said variable capacitance means of said first and said second constant K filter so that said carrier signal in said first and second signal path are phase modulated in mutually opposite phase senses; a fixed phase shift network coupled to one of said first and second signal path; a hybrid network coupled to the other of said first and second signal path and said fixed phase shift network and providing a resultant signal varying in accordance with said input signal; first and second detector means coupled to said hybrid network for providing an amplitude varying signal; and an output load circuit for providing an amplified output signal in accordance with said input signal.

9. Amplifier apparatus as set forth in claim 8 wherein said variable capacitance means of said first and said second constant K filter comprises capacitive diodes.

10. Amplifier apparatus as set forth in claim 8 wherein said variable capacitance means of said first and said second filter network are comprised of semiconductor diodes.

11. Amplifier apparatus as set forth in claim 8 wherein said fixed phase network comprises a quadrature lag phase shift network.

12. Amplifier apparatus as set forth in claim 8 wherein said hybrid network comprises transformer means having a primary winding and a secondary winding including a center tap, said primary winding being connected to said one signal path, and said fixed phase shift network being connected to said center tap, and said composite signal being available at the end terminals of said secondary winding.

13. Amplifier apparatus as set forth in claim 8 wherein said first and second detector means each comprise a full wave detector comprising transformer means coupled to said hybrid network and a plurality of rectifier means coupled to said transformer means.

14. Apparatus as set forth in claim 8 wherein said load circuit comprises a carrier load circuit comprising resistance-capacitance means coupled to each said first and second detector means, a DC load means comprising resistance means coupled to each said first and second detector means and a signal load coupled to each said first and second detector means and comprised of a resistance-inductance combination.

15. A broadband amplifier of electrical signals comprising in combination: a first constant K filter network including a plurality of voltage variable capacitors; a second constant K filter network also having a plurality of voltage variable capacitors; circuit means coupling said voltage variable capacitors of said first and said second constant K filter network to a common junction point; input means coupled to said common junction point for applying an input signal thereto; transformer means coupled to said first and said second constant K filter network for applying a carrier signal thereto and operating said first and said second constant K filter network in a push-pull relationship, said input signal being effective to vary the capacitance of said voltage variable capacitors of said first and said second constant K filter network for phase modulating said carrier signal applied thereto in mutually opposite directions; phase shift means coupled to one of said constant K filter networks for shifting said carrier signal through a predetermined phase angle; summing means coupled to said other constant K filter network and said phase shift means for providing a composite phase modulated signal; full wave detector means coupled to said summing means for providing an amplitude modulated signal from said composite signal; and an inductor-capacitor-resistor load circuit combination selectively chosen so that the impedance of said combination appears resistive at the frequency of said input signal for providing an output signal.

16. Apparatus as set forth in claim 15 wherein said hybrid network comprises a first transformer having a primary winding and a secondary winding with a center tap, with said primary winding being coupled to one constant K filter, the center tap being adapted to be connected to said phase shift network; and wherein said full wave detector means comprises a second and a third transformer, each having a primary winding and a secondary winding with a center tap, circuit means coupling the primary winding of said second and said third transformer to opposite ends of said secondary winding of said first transformer, means for connecting said center taps of said second and said third transformer to a point of reference potential and rectifier means coupled to each said secondary winding of said second and third transformer and being selectively poled such that said second transformer transmits only signals of one polarity while said third transformer only transmits signals of the opposite polarity.

17. The apparatus as set forth in claim 16 wherein said first and said second constant K filter networks are comprised of a plurality of filter sections each comprising two inductance elements and a voltage variable capacitive semiconductor diode.

18. The apparatus as set forth in claim 16 wherein said first and said second constant K filter networks include a plurality of capacitive diodes coupled together such that said input signal advances the phase in one constant K network while retarding the carrier phase in the other constant K network.

References Cited

UNITED STATES PATENTS

| | | | |
|---|---|---|---|
| 1,666,206 | 4/1928 | Hartley | 332—45 |
| 2,020,409 | 11/1935 | Green | 332—45 X |
| 2,912,581 | 11/1959 | DeLange | 332—24 X |
| 3,045,189 | 7/1962 | Engelbrecht | 329—129 X |
| 3,101,452 | 8/1963 | Holcomb et al. | |
| 3,316,421 | 4/1967 | Biard | 307—88.3 |

ALFRED L. BRODY, *Primary Examiner.*